July 28, 1959 — R. L. LICH — 2,896,551
RAILWAY TRUCK AIR SPRING STRUCTURE
Filed Aug. 29, 1955 — 2 Sheets-Sheet 1

INVENTOR.
Richard L. Lich
BY Rodney Bedell
Atty.

United States Patent Office 2,896,551
Patented July 28, 1959

2,896,551

RAILWAY TRUCK AIR SPRING STRUCTURE

Richard L. Lich, Ferguson, Mo., assignor to General Steel Castings Corporation, Granite City, Ill., a corporation of Delaware Application August 29, 1955, Serial No. 531,236

9 Claims. (Cl. 105—199)

The invention relates to railway rolling stock and more particularly to a truck structure which supports a vehicle body by a spring device at each side of the truck comprising in a single unit a collapsible air chamber, a metallic coil safety spring within the chamber and a valve within the chamber for controlling air pressure.

It is an object of the invention to combine, in a single compact unit, the advantages of an air spring and the durability of a normally unloaded coil spring. Another object is to provide a completely self-contained air spring unit which may be removed from service as a unit and replaced as easily as a coil spring. Another object is to control the air spring pressure and hence stabilize the vehicle body height by load responsive valve structure wholly contained within the air spring. The foregoing objects are important because air springs have been objected to on the grounds that additional space consuming safety devices including stops or metallic springs were required in installations where space was limited, that removal and replacement of worn or damaged air springs necessitated partial or complete disassembly of the spring, and that external level regulating valves required further encumbrance of the suspension structure. Another object is to stabilize an air spring against lateral distortion. Another object is to reduce the weight of the truck substantially below that usually required for railway trucks used in high speed service.

These and other detail objects are attained by the structure illustrated in the accompanying drawings, in which.

Figure 1:
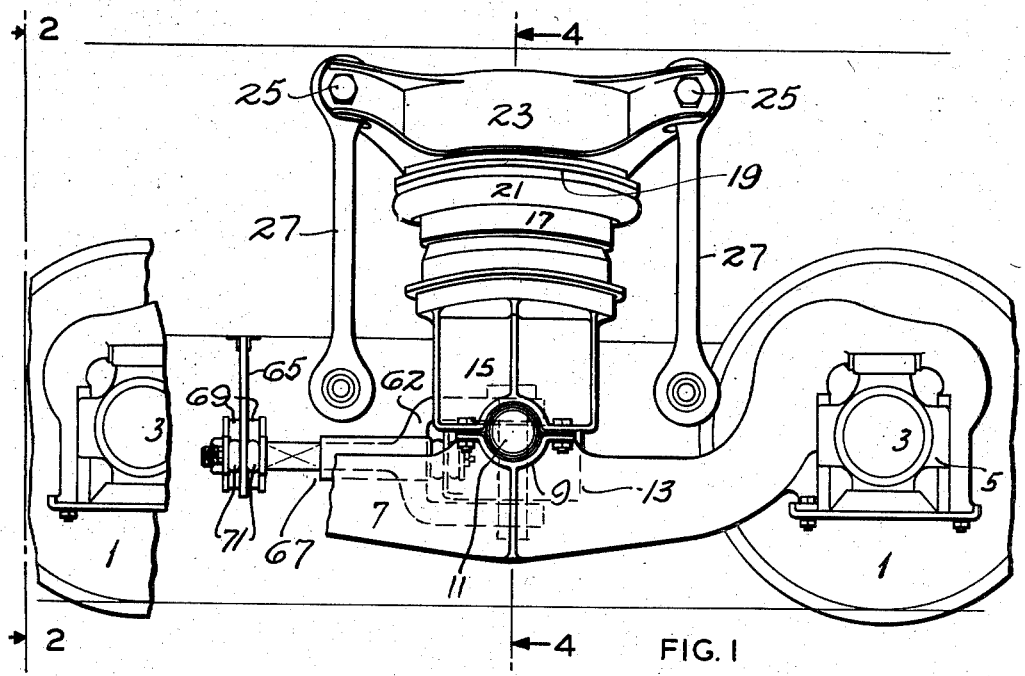
Figure 1 is a side elevation of a two-axle four-wheel equalized truck provided with the spring devices mentioned above.
Figure 2:
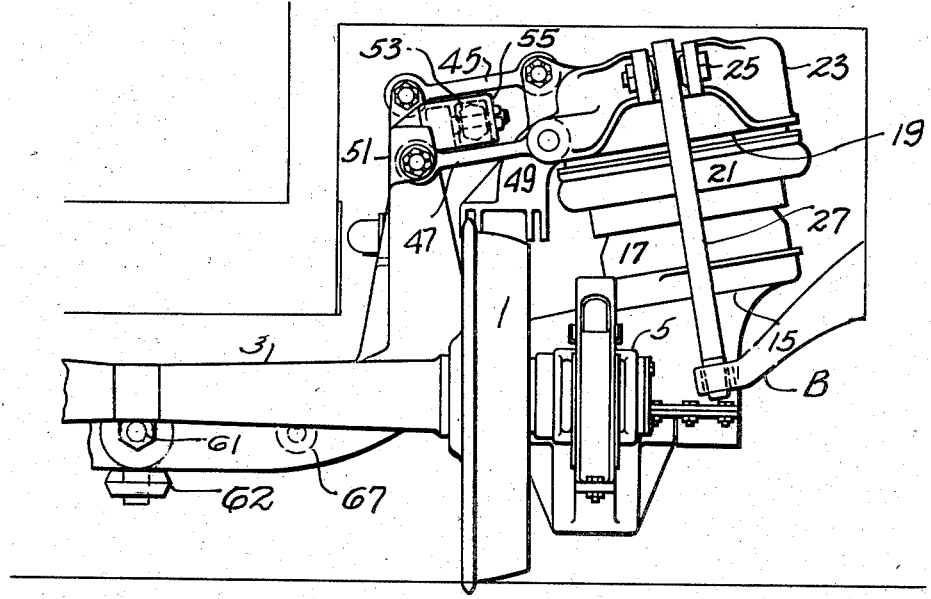
Figure 2 is an end view, looking in the direction indicated by the line 2—2 of Figure 1, of one transverse half of the truck shown in Figure 1 with the adjacent portion of the vehicle body indicated.
Figure 3:
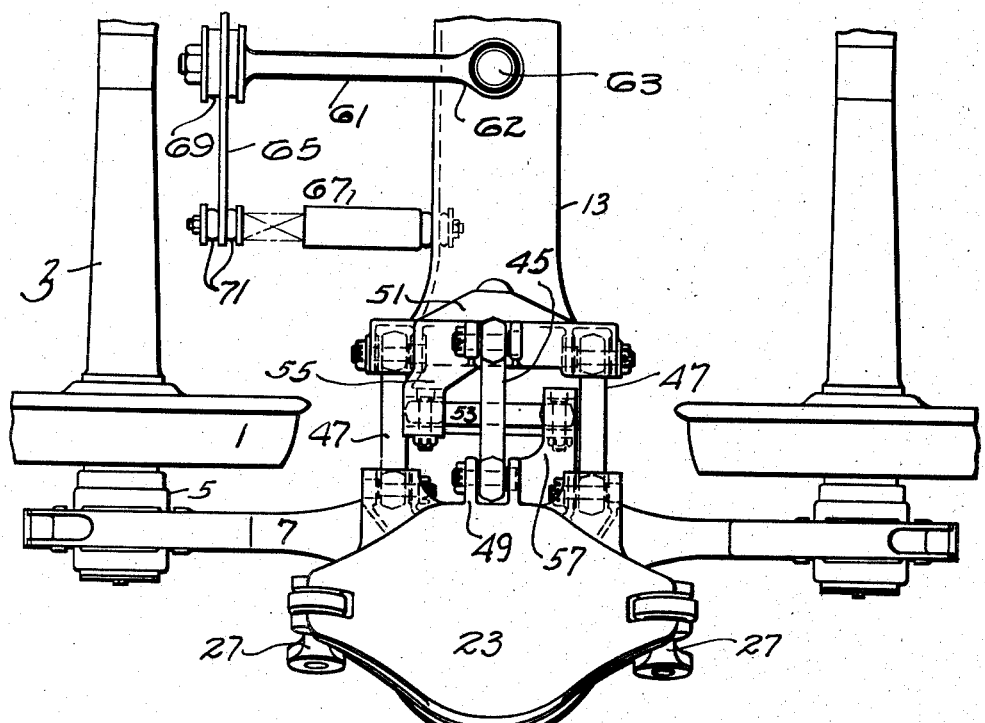
Figure 3 is a top view of the structure shown in Figures 1 and 2.
Figures 4, 5:
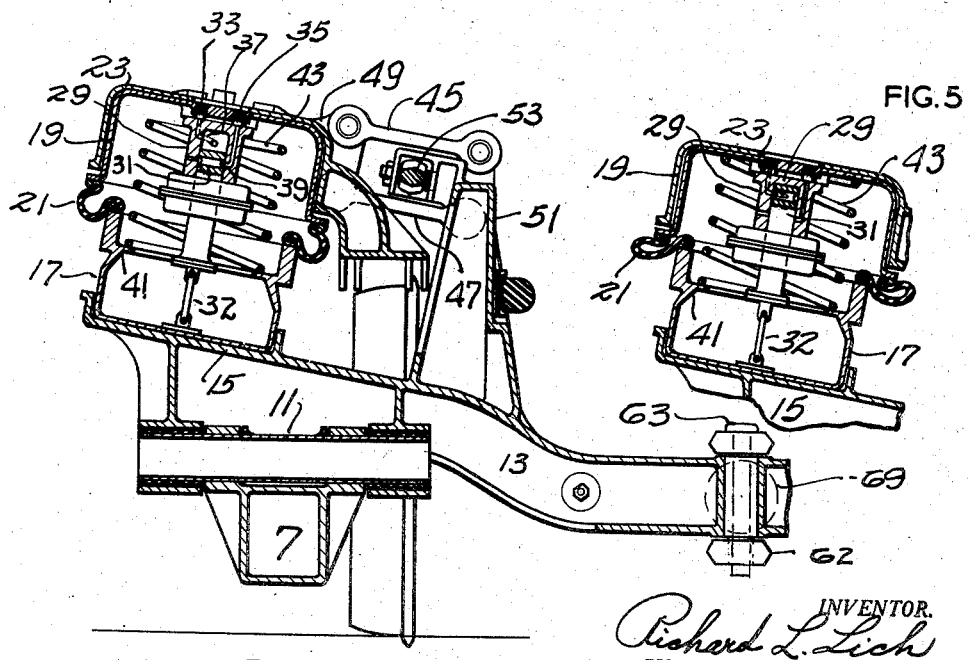
Figure 4 is a vertical section taken on line 4—4 of Figure 1 and drawn to an enlarged scale showing the spring device expanded.
Figure 5 is a corresponding detail section showing the air spring fully compressed.

The truck includes wheels 1, axles 3, journal boxes 5, and equalizers 7, as is common. The intermediate portion of each equalizer forms an upwardly facing arcuate bearing 9 for a trunnion 11 which journals the end portion of a spring plank or transom 13 extending transversely of the truck and provided with seats 15 for the spring devices. The equalizers and spring plank may be considered the equivalent of a truck frame.

Each spring device includes an upwardly facing cuplike lower member 17 mounted on a seat 15, a downwardly facing cup-like upper member 19, and a flexible intermediate bellows-like band 21 connected to the adjacent rims of members 17 and 19.

A yoke-like cap 23 fits over spring member 19 and terminates in brackets providing bearings for pivot pins 25 from which hangers 27 are suspended. These hangers depend at the sides of the spring device and swing longitudinally of the truck and are arranged at their lower ends for connection to brackets B projecting inwardly from the sides of a vehicle body framing.

Positioned within the upper cup-like member 19 and secured to its top wall is a valve housing 29 receiving a piston 31, the lower end of which is connected by a link 32 to the bottom wall of the lower cup-like member 17. An air inlet conduit 33 leads to housing 29 and an air exhaust conduit 35 leads from housing 29. Inlet conduit 33 leads from a source of compressed air (not shown). Outlet conduit 35 leads to the atmosphere. Valve housing 29 is provided with ports 37 and 39 which may be alternately blocked and unblocked by piston 31 when the spring members 17, 19 move toward each other or from each other at predetermined distances. Hence an undue compression of the spring device will cause a supply to the air chamber of air under greater pressure than is in the air chamber, and undue expansion of the spring device will exhaust some of the air within the air chamber.

Member 17 has an upwardly facing annular shoulder 41 and a metallic coil compression spring 43 is seated on shoulder 41. During normal functioning of the air chamber, the upper end of spring 43 is spaced from the top wall of member 19 and does not function. In the event of excessive reduction in air pressure, or failure of the bellows-like band 21, spring 43 will assume the entire vehicle load.

Obviously, as the load is increased the air chamber will afford increasing resistance to compression due to the inherent characteristic of the confined air offering greater resistance as its volume is reduced.

Transverse links 45 and 47 are pivoted at their ends to a bracket 49 on yoke 23 and to a suitable bracket 51 on spring plank 13, thus holding the spring device against movement transversely of the truck relative to the spring plank. The vertical spacing of links 45 and 47 will hold upper member 19 against tilting transversely of the truck about the spring device axis. The air spring is held against movement relative to the spring plank lengthwise of the truck by a longitudinal anchor 53 pivotally connected at one end to an arm 55 on bracket 51 and at its opposite end to a bracket 57 on cap 23.

The truck is pivotally connected to the body underframe by a central longitudinal anchor 61 having a clevis 62 at one end receiving the spring plank and connected thereto by pin 63, the other end of the anchor being bolted to a bracket 65 depending from the vehicle body underframe. Anchor 61 tends to hold spring plank 13 against tilting longitudinally of the vehicle from its normal position. Hence elements 47, 53 and 61 will stabilize the transom and springs and the associated parts.

A friction type shock absorber 67 at each side of anchor 61 yieldingly resists the swinging of the spring plank about pivot pin 63. Rubber pads 69, on the lefthand end of anchor 61, and 71 on the ends of shock absorber 67 are compressed by the anchor and shock absorber bolts and accommodate relatively vertical movement of the underframe and truck resulting from the action of the air spring units.

The arrangement described provides a light weight truck with a single spring unit at each side which combines an air spring, a coil spring adapted to function in the event of failure of the air spring, and a valve device for maintaining vehicle height, by the normal functioning air spring, substantially constant regardless of load.

The arrangement dispenses with the usual truck frame extending from journal box to journal box and provided with transoms. Instead of the usual spring plank and bolster mounted in a truck frame and supporting the body load on a center plate, there is a single transverse spring plank transom holding the equalizers in spaced relation but free to tilt thereon as may be required by track irregularities and anchored to the vehicle body underframe. The sole support of the vehicle body is through hangers 27 at the sides of the truck. The sole pivotal connection to the truck is effected by linkage 61 between the intermediate portion of spring plank 13 and the vehicle body. The upright pin 62 through the spring plank and the vertically spaced jaws of clevis 62 retain the spring plank against tilting in a vertical plane extending longitudinally of the truck and thereby tend to stabilize the action of the air-coil spring units.

If it is desired to replace or repair a spring unit, it is readily removed from the truck and body assembly and later replaced.

The details of the structure may be varied other than as indicated without departing from the spirit of the invention and the excessive use of those modifications coming within the scope of the claims as contemplated.

What is claimed is:

1. In a railway truck, wheels and axles, an equalizer supported at its ends on said axles, a spring structure supported therefrom including a vertically collapsible and expandable air chamber, a yoke-like cap supported by said spring structure, swing hangers suspended from said cap at opposite sides of said spring structure and arranged to support a vehicle body from their lower ends, a valve in said chamber including a part movable vertically by the vertical movement of the upper and lower ends of said chamber relative to each other, a conduit for air under pressure leading to said valve, an exhaust conduit leading from said valve, said valve having inlet and exhaust ports connected to said conduits and alternately opened and closed by said valve as it is moved by the contraction and expansion of the chamber beyond predetermined points by the load on said swing hangers.

2. A railway truck according to claim 1 in which a metal coil safety spring is positioned between the upper and lower ends of the air chamber and is compressed by the movement of said ends toward each other in the event of the air chamber being inoperative.

3. In a railway truck, spaced wheeled axles, a member extending from side to side of the truck and supported at its ends from said axles, upright air springs mounted on said member at the sides of the truck for supporting a vehicle body so as to accommodate relative movements of the truck and body, an anchor extending longitudinally of the truck and pivotally connected at one end to the intermediate portion of said member, means at the other end of said anchor for pivotal attachment to a railway vehicle body underframe, and linkage yielding lengthwise of the truck and spaced transversely of the truck from said anchor and pivotally connected at one end to said member and provided at its other end with means for pivotal connection to the vehicle body whereby the truck may swivel relative to the underframe about its pivotal connection to the anchor but is held against movement as a unit lengthwise of the vehicle body.

4. In a railway truck, spaced wheeled axles, equalizers between and supported from said axles, a transverse spring plank carried by said equalizers, springs on the end portions of the spring plank, body support elements on said springs, an anchor extending longitudinally of the truck and pivotally connected at one end to said spring plank, means at the other end of said anchor for pivotal attachment to a railway vehicle body underframe, and linkage spaced transversely of the truck from said anchor and pivotally connected at one end to said spring plank and provided at its other end with means for pivotal connection to the vehicle underframe, said linkage being yieldable lengthwise of the truck to accommodate swiveling of the truck about its pivotal connection to said anchor.

5. In a railway truck, spaced wheel axles, equalizers extending between said axles, a transom member extending from side to side of the truck and pivotally supported at its ends from the intermediate portions of said equalizers, means at the sides of the truck for supporting a vehicle body from the ends of said member, an anchor extending longitudinally of the truck along the longitudinal center line thereof and provided with vertically spaced clevis jaws at one end receiving between them the intermediate portion of said member, an upright pivot pin extending through said clevis jaws and member, means at the other end of said anchor for attachment to a vehicle body underframe whereby said anchor forms a swiveling connection between the transom member and a vehicle body and holds the transom member against tilting in a vertical plane extending longitudinally of the truck.

6. A railway vehicle spring structure comprising an upwardly facing cup-like lower member, a downwardly facing load-supporting cup-like upper member above said lower member, a cylindrical member of flexible material connecting the upper rim of said lower member and the lower rim of said upper member, said members forming an expandable and collapsible chamber for compressed air, the upper member being tiltable in a vertical plane extending longitudinally of the truck, a coil spring seated in said lower member with its upper end opposing the horizontal wall of said upper member but spaced therefrom when the chamber is expanded, there being brackets on the side of said upper member projecting transversely to the axis of the spring structure and outwardly from opposite sides of said spring structure and terminating at their outer ends in supports for load-carrying swing hangers.

7. In combination with a railway vehicle body and a truck beneath the same having wheeled axles with equalizers extending between them and a transverse transom substantially at the level of said equalizers and supported therefrom, there being vertically yielding springs mounted on the ends of the transom including yoke-like caps, swing hangers suspended from said caps and supporting the vehicle body from their lower ends, and an elongated anchor extending along the longitudinal center line of the body and truck and having vertically spaced clevis jaws at one end embracing the transom between them and provided with an upright pivot to the transom and having at its other end a vertically fixed connection to the vehicle body, said anchor transmitting longitudinal forces between the truck transom and the vehicle body and holding the truck transom against tilting lengthwise of the vehicle and swiveling the truck transom and the vehicle body to each other.

8. A vehicle body and truck combination according to claim 7 which includes elongated snubbers at opposite sides of and paralleling the elongated anchor and connected at their opposite ends to the transverse transom and vehicle body respectively and yieldingly resisting rotation of the transverse transom, equalizers and wheeled axles about the pivotal connection to the anchor.

9. In combination with a railway vehicle body and a truck beneath the same having wheeled axles with equalizers extending between them and a transverse transom substantially at the level of said equalizers and supported therefrom, there being vertically yielding springs mounted on the ends of the transom including yoke-like caps, swing hangers suspended from said caps to swing lengthwise of the vehicle body and supporting the vehicle body from their lower ends, and an elongated anchor extending along the longitudinal center line of the body and truck and having pivotal connections, with upright axes, to the transom and vehicle body at opposite ends respectively, said anchor transmitting longitudinal forces between the truck transom and vehicle body, there being snubbers connected to the truck transom and vehicle body at opposite sides of said elongated anchor and yieldingly resisting swinging of said hangers on said spring caps.

References Cited in the file of this patent

UNITED STATES PATENTS

| | | |
|---|---|---|
| 326,999 | Manning | Sept. 29, 1885 |
| 538,865 | Brill et al. | May 7, 1895 |
| 779,858 | Lillie | Jan. 10, 1905 |
| 1,008,290 | Verge | Nov. 17, 1911 |
| 2,011,918 | Stedefield et al. | Aug. 20, 1935 |
| 2,190,762 | Anderson | Feb. 20, 1940 |
| 2,257,913 | Maranville | Oct. 7, 1941 |
| 2,268,267 | Sheesley | Dec. 30, 1941 |
| 2,537,637 | Candlin et al. | Jan. 9, 1951 |
| 2,638,811 | Poage | Apr. 7, 1953 |
| 2,694,368 | Gouirand | Nov. 16, 1954 |